US010766625B2

(12) United States Patent
Santiago (10) Patent No.: US 10,766,625 B2
(45) Date of Patent: Sep. 8, 2020

(54) RELEASE SYSTEM FOR INFLATABLE LIFE SAVING DEVICES

(71) Applicant: Air Cruisers Company, LLC, Wall Township, NJ (US)

(72) Inventor: Agapito J. Santiago, Point Pleasant, NJ (US)

(73) Assignee: Air Cruisers Company, LLC, Wall Township, NJ (US)

( * ) Notice: Subject to any disclaimer, the term of this patent is extended or adjusted under 35 U.S.C. 154(b) by 570 days.

(21) Appl. No.: 15/475,527

(22) Filed: Mar. 31, 2017

(65) Prior Publication Data

US 2018/0210483 A1  Jul. 26, 2018

Related U.S. Application Data

(60) Provisional application No. 62/333,918, filed on May 10, 2016.

(51) Int. Cl.
| | | |
|---|---|---|
| B64D 25/14 | (2006.01) | |
| B63C 9/22 | (2006.01) | |
| B64D 25/16 | (2006.01) | |
| B64D 25/18 | (2006.01) | |
| B63C 9/04 | (2006.01) | |

(52) U.S. Cl.
CPC .............. *B64D 25/14* (2013.01); *B63C 9/22* (2013.01); *B64D 25/16* (2013.01); *B64D 25/18* (2013.01); *B63C 2009/042* (2013.01)

(58) Field of Classification Search
CPC ........ B64D 25/14; B64D 25/18; B64D 25/16; B63C 9/22; B63C 2009/042
See application file for complete search history.

(56) References Cited

U.S. PATENT DOCUMENTS

| | | |
|---|---|---|
| 5,102,070 A | 4/1992 | Smialowicz et al. |
| 5,180,121 A | 1/1993 | Banks et al. |
| 6,685,139 B2 | 2/2004 | Blum et al. |
| 6,786,454 B2 | 9/2004 | Baderspach et al. |
| 7,380,755 B2 | 6/2008 | Matsch |
| 7,490,795 B2 | 2/2009 | Clegg et al. |
| 8,919,699 B2 | 12/2014 | Kress et al. |
| 9,242,737 B2 | 1/2016 | Islam et al. |
| 9,296,484 B2 * | 3/2016 | Biro ...................... B64D 25/14 |
| 9,522,738 B2 | 12/2016 | Schmidt et al. |
| 9,849,994 B2 | 12/2017 | Schmidt et al. |
| 2006/0266888 A1 | 11/2006 | Matsch |
| 2007/0023578 A1 | 2/2007 | Myers et al. |

(Continued)

FOREIGN PATENT DOCUMENTS

| | | |
|---|---|---|
| EP | 1911674 | 4/2008 |
| EP | 3085624 | 10/2016 |

(Continued)

*Primary Examiner* — Victor L Macarthur
(74) *Attorney, Agent, or Firm* — Kilpatrick Townsend & Stockton LLP (57) ABSTRACT

Described is a release system for inflatable life saving devices, such as evacuation slides, evacuation slide/rafts, emergency floats, emergency flotation systems, and life rafts. The release system incorporates an energy storing device and a securement system that can be released upon activation. Once the release system is activated, the securement system is opened to allow deployment of the inflatable.

15 Claims, 5 Drawing Sheets

(56) References Cited

U.S. PATENT DOCUMENTS

| | | | |
|---|---|---|---|
| 2013/0200217 A1* | 8/2013 | Biro | B64D 25/14 244/137.2 |
| 2016/0083071 A1 | 3/2016 | Pichlmaier et al. | |
| 2017/0057646 A1 | 3/2017 | Schmidt et al. | |
| 2018/0072426 A1 | 3/2018 | Schmidt et al. | |

FOREIGN PATENT DOCUMENTS

| | | | | |
|---|---|---|---|---|
| GB | 565674 A | * | 11/1944 | B64D 17/52 |
| GB | 585265 A | * | 2/1947 | B64D 17/56 |
| GB | 735499 A | * | 8/1955 | B64D 17/70 |
| GB | 828492 A | * | 2/1960 | B64D 17/52 |
| GB | 830556 A | * | 3/1960 | B64D 17/52 |

* cited by examiner

RELEASE SYSTEM FOR INFLATABLE LIFE SAVING DEVICES

CROSS REFERENCE TO RELATED APPLICATIONS

This application claims the benefit of U.S. Provisional Application Ser. No. 62/333,918, filed May 10, 2016, titled "Lacing Cover Release Mechanism," the entire contents of which are hereby incorporated by reference.

FIELD OF THE DISCLOSURE

Embodiments of the present disclosure relate generally to a release system for inflatable life saving devices, such as evacuation slides, evacuation slide/rafts, emergency floats, emergency flotation systems, and life rafts. The release system incorporates an energy storing device and a securement system that can be released upon activation. Once the release system is activated, the securement system is opened to allow deployment of the inflatable.

BACKGROUND

In order to meet safety regulations, certain passenger aircraft must be equipped with certain types of inflatable life-saving devices, such as evacuation slides, evacuation slide/rafts, emergency floats, emergency flotation systems, and life rafts. These inflatable devices are often secured in an enclosure (sometimes referred to as a packboard) that is mounted in place to the fuselage. The inflatable device is packed within the enclosure, and a soft fabric cover is laced over the enclosure (often referred to as a "lacing cover"). A door panel/cover is then positioned over the lacing cover and enclosure. The door panel/cover is typically activated by a pneumatic system or an air piston system that releases a ball and detent lock. Pressure of the inflatable device (while inflating) pushes the door panel away.

In one example, the soft cover that contains the inflatable device beneath the door panel is made of fabric panels that are attached to the enclosure to form a lid. The fabric panels are laced together, with the laces pulled tight to maintain the desired tension. The lacing cover is intended to prevent the inflatable from being lost if the door panel is lost during flight. The fabric panels are designed to open (un-lace or be cut) in order to deploy the evacuation slide.

In some examples, a combination of Velcro® and snaps may be used to hold the lacing cover in the closed position. When the inflatable device begins to inflate, the inflation forces can cause disengagement of the combination of Velcro® and snaps, allowing the lacing cover to open. Although generally secure, this option cannot withstand high wind forces.

In addition to some of the described challenges experienced with designing lacing covers, some aircraft are also beginning to require that the lacing cover maintain the inflatable device in place, even upon accidental removal of the door panel/cover. Accordingly, the present inventors have explored a more robust securement of the fabric panels and improvements thereto.

BRIEF SUMMARY

Embodiments of the invention described herein thus provide systems and methods for securing an inflatable life saving device in place until its use is required. The system incorporates an interlocking system that releaseably secures two panels to one another, enclosing the inflatable device. The interlocking/release system incorporates an energy storing device and a securement system that can be released upon activation. Once the release system is activated, the securement system is opened to allow deployment of the inflatable.

In one example, there is provided a release system for inflatable life saving devices. The release system provides a first panel comprising a plurality of protrusions; a second panel comprising a plurality of receiving openings, each receiving opening sized and configured for receiving a corresponding protrusion; the protrusions comprising apertures sized and configured for receiving a retaining device; a cable comprising (a) a plurality of retaining devices positioned along the release cable and (b) an energy storing device; the plurality of retaining devices positioned along the release cable being sized and configured to be received by the protrusions; the energy storing device configured to store energy in order to cause movement of the cable upon release of the cable.

In a more specific example, the release system has first and second panels; an interlocking securement system comprising at least one first element on the first panel and at least one second element on the second panel, wherein engagement of the at least one first element with the at least one second element causes engagement of the first and second panels, a release cable comprising (a) at least one feature configured to engage with and release from one of the first or second elements and (b) an energy storing device; an activation system that maintains the release cable in a first position such that the at least one feature engages with one of the first or second elements, and that releases the release cable to a second position that releases the feature from one of the first or second elements.

Use of the release system to inflate an inflatable life saving device may include providing one of the release systems described herein and securing the panels to one another via the interlocking systems described. In a specific example, the release system for this method has a first panel comprising a plurality of protrusions; a second panel comprising a plurality of receiving openings, each receiving opening sized and configured for receiving a corresponding protrusion; the protrusions comprising apertures sized and configured for receiving a retaining device; a cable comprising (a) a plurality of retaining devices positioned along the release cable and (b) an energy storing device; the plurality of retaining devices positioned along the release cable being sized and configured to be received by the protrusions; the energy storing device configured to store energy in order to cause movement of the cable upon release of the cable. The user then secures the first panel and second panel with respect to one another by positioning each of the receiving openings over a corresponding protrusion, and positioning each of retaining devices into the protrusions.

DETAILED DESCRIPTION

Embodiments of the present disclosure provide an inflatable device cover that is used for containment of the inflatable device and appropriate release of the inflatable device upon activation and deployment. The systems described can prevent aerodynamic loads from forcing premature release (or loss) of the inflatable device, even if the door panel/cover is removed or lost during flight. By providing a secondary release mechanism, a more robust securement can be achieved.

Figure 1:
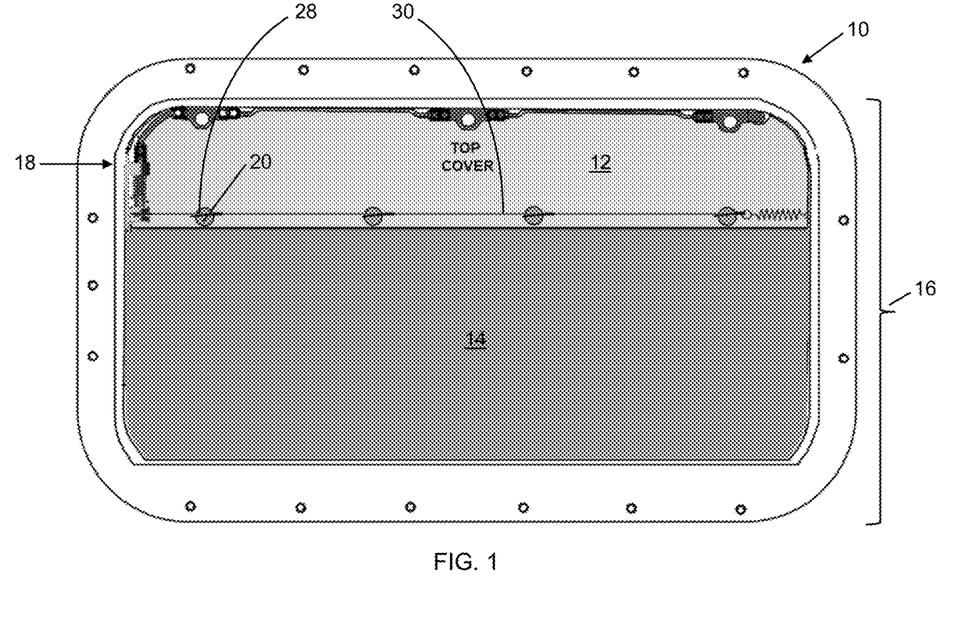
FIG. 1 shows a top plan view of one example of a release system for securing an inflatable life saving device.
Figure 2:
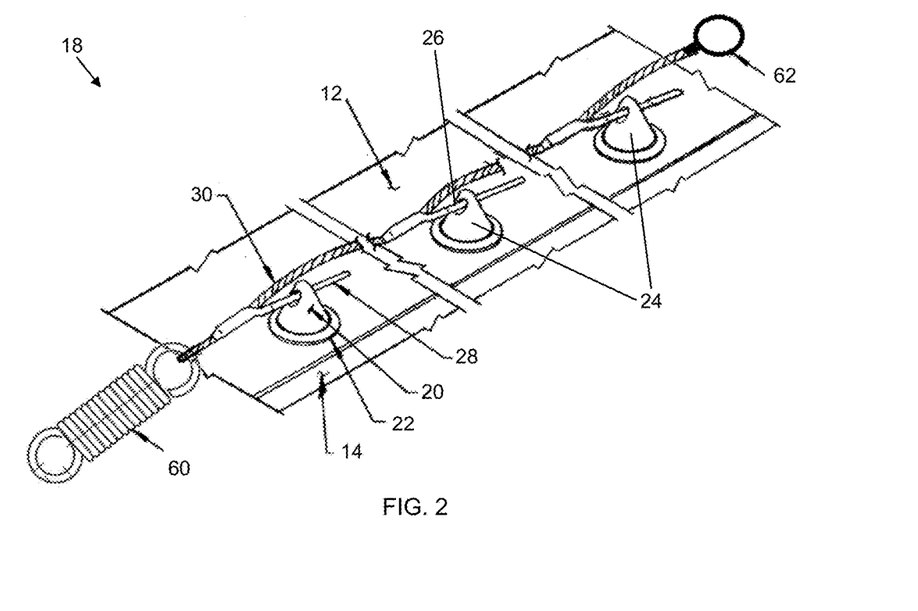
FIG. 2 shows a side perspective view of the release system of FIG. 1.
Figure 3:
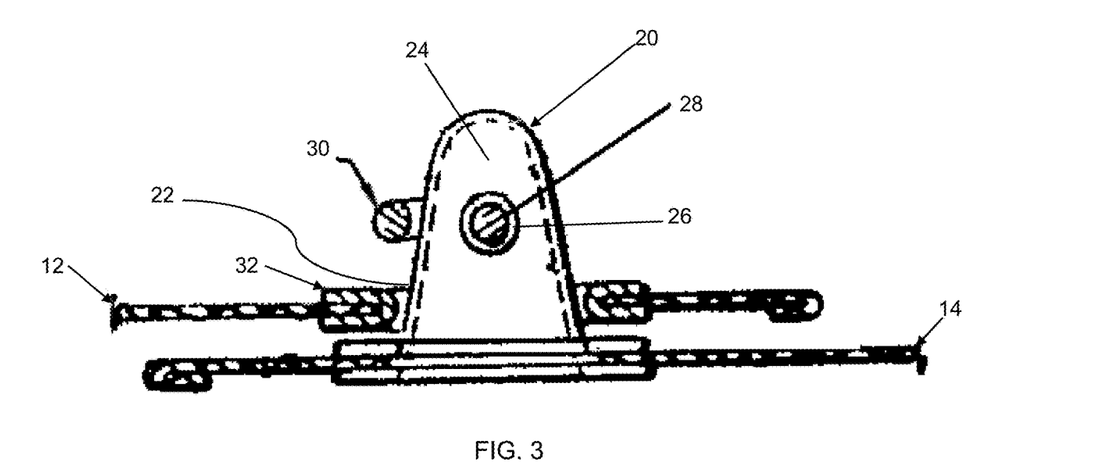
FIG. 3 shows a side cross-sectional view of the release system of FIG. 2.
Figure 4:
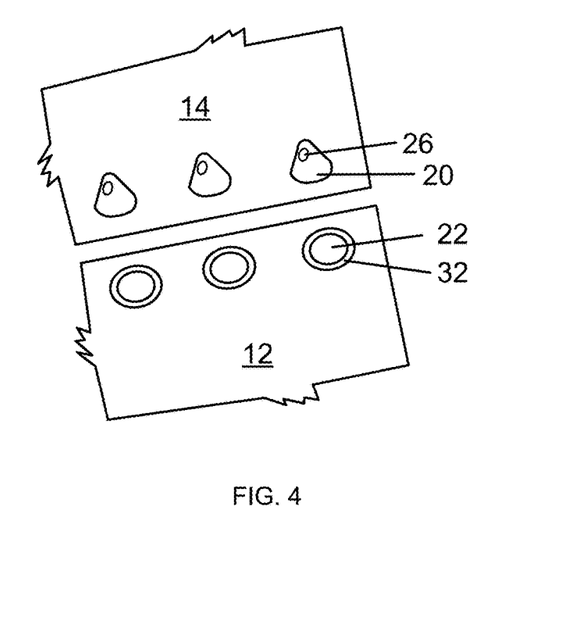
FIG. 4 shows a top perspective view of the release system of FIG. 2, with the panels separated from one another.

As illustrated by FIG. 1, the release system 10 generally includes two panels 12, 14 that provide a cover 16 for an inflatable device. This release system 10 can function without the lacing that has previously been used to secure two fabric panels to one another. Instead, the panels 12, 14 may be secured to one another via an interlocking system 18. One embodiment of one interlocking system 18 is illustrated by FIGS. 2-4. In these examples, the interlocking system 18 includes a series of protrusions 20 positioned on one panel 14 and a series of receiving openings 22 on the other panel 12. In use, a receiving opening 22 receives a protrusion 20 in order to maintain contact between the two panels 12, 14. FIGS. 2 and 3 show panels secured to one another. FIG. 4 shows panels that are not yet secured.

As shown, the protrusions 20 may be shaped as parachute cones 24. This shape may help the protrusions 20 easily slide into receiving openings 22. The cones 24 may have an upper portion that tapers into a wider, lower base portion. This can create a pyramidal shape along which the receiving opening 22 may slide. The base portion may be similarly sized as the receiving opening (albeit slightly smaller in diameter) in order to create a secure connection therebetween. It should be understood, however, that any appropriate shape for protrusions 20 may be used and is considered within the scope of this disclosure. Each protrusion 20 is shown as having an aperture 26 configured to receive a retaining device 28. The retaining device 28 may be formed as a pin, a rod, a clip, a fastener, a key, a slide bolt, or any other element that can be received by the aperture 26. At least one retaining device 28 is secured to a release cable 30. It is generally expected that a plurality of retaining devices 28 will be positioned along the cable 30. The retaining device 28 may be secured to the cable 30 via a hinged connection, allowing the retaining device 28 to move with respect to the cable 30. In another example, the retaining device 28 may be rigidly secured to the cable 30 at an angle, so that the device 28 can be positioned in an aperture 26 and then pulled out once the cable is moved.

The release cable 30 extends along the substantial length of the panels 12, 14. Positions along the release cable 30 that correspond to positions of the protrusions 20 and parachute cones 24 are provided with a retaining device 28. Each retaining device 28 is sized and configured to be received by the aperture 26.

As shown in FIGS. 3 and 4, the receiving openings 22 may be reinforced by a grommet 32. The grommets 32 can help prevent tearing of the panel 12, even when an appropriate amount of tension is applied. It is generally expected that the receiving openings 22 will be circular and reinforced with a circular grommet 32, but it should be understood that it is possible for the receiving opening 22 to be any other appropriate shape. Exemplary alternate shapes include, but are not limited to oval, square, rectangle, triangle, or any other option.

In use, the panel 12 with the receiving openings 22 is placed such that the receiving openings 22 extend over and receive the protrusions 20. This is illustrated by the sectional view of FIG. 3. Once the protrusions 20 and receiving openings 22 are in cooperation with one another, a retaining device 28 of the release cable 30 may be positioned in a corresponding aperture 26 of the protrusion 20. The positioning of each retaining device 28 within an aperture 26 prevents the panels from disengaging. If the panel 12 with the receiving openings 22 were to be pulled upward, downward, or otherwise away from the panel 14, the presence of the retaining device 28 will halt any further potential disengagement movement. The two panels 12, 14 are securely connected to one another as long as one or more of the retaining devices 28 remain in position in the apertures 26 of the protrusions 20.

FIG. 2 shows only a portion of the panels. It should be understood that any number of protrusions and receiving openings may be used. The number used may be based on what is required to cause the desired securement, balanced with weight, cost, and assembly time considerations.

Figure 5A:
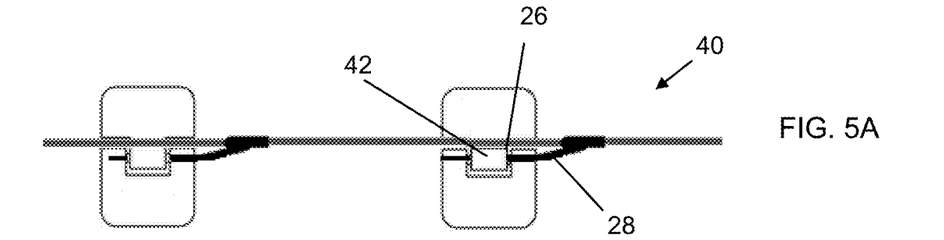
FIG. 5A shows an alternate example of a release system for securing an inflatable device in a closed/secured position.
Figure 5B:
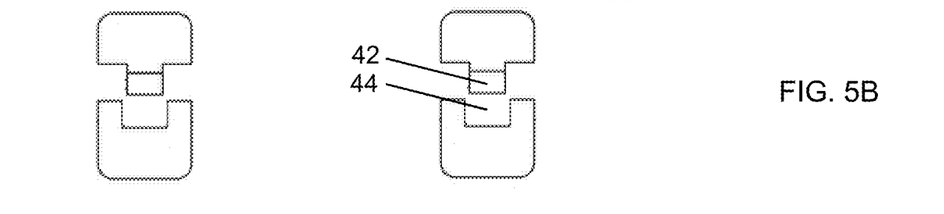
FIG. 5B shows the release system of FIG. 5A in an open/released position.

FIGS. 5A and 5B illustrate an alternate embodiment of an interlocking system 40. This interlocking system provides a hinge type release. One of the panels has a hinge protrusion 42 and the other panel has a hinge receiving opening 44. The hinge protrusion 42 and hinge receiving opening 44 cooperate or otherwise interface with one another. The hinge protrusion 42 is provided with an aperture 26. Positioning of a retaining device 28 within the aperture 26 secures the protrusion 42 and receiving opening 44 with respect to one another, as shown by FIG. 5A.

Although two different locking systems are shown and described, it should be understood that other systems are possible and considered within the scope of this disclosure. For example, any system that provides two correspondingly shaped members that may be positioned on the different panels such that they cooperate or interface with one another in order to maintain the panels in cooperation and may be secured by a retaining device, pin, or other cable-based or cable-secured mechanism may be used.

When deployment of the inflatable device is necessary, removal of the retaining devices 28 from the apertures 26 occurs. In one example, this removal is provided by an activation system 46 that allows activation of an energy storing device 60 (as described further below). In one specific example, the activation system 46 is a pneumatic system. It is possible for the pneumatic system to be similar to the pneumatic system that is currently used to release the door panel/cover ball locks. In other examples, the system may be activated by any type of strain energy storing device. Non-limiting examples include, but are not limited to an extension spring, compression spring, torsion spring, leaf spring, drawbar spring, disc or belleville spring, wave spring, clock spring, elastic material, rubber band, flexcord or bungee system, compressed gas, charged cylinder, compressed gas cylinder, pneumatic system, shock absorber, linear actuator, squib, solenoid valve, or any combination thereof, or any other energy storing device or any other activation system.

Figure 6:
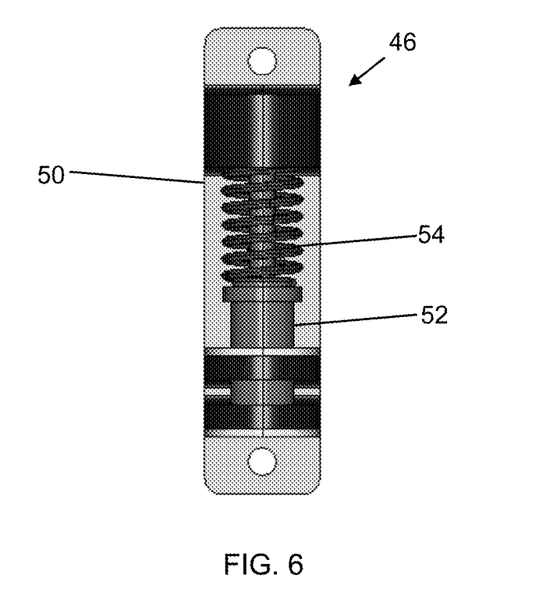
FIG. 6 shows a side plan view of one example of an activation system for the release systems described herein.
Figure 7A:
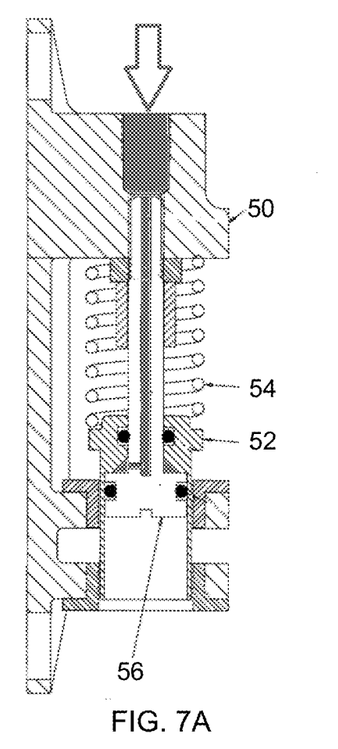
FIG. 7A shows a side cross-sectional view of an activation system in a closed/cable secured position.
Figure 7B:
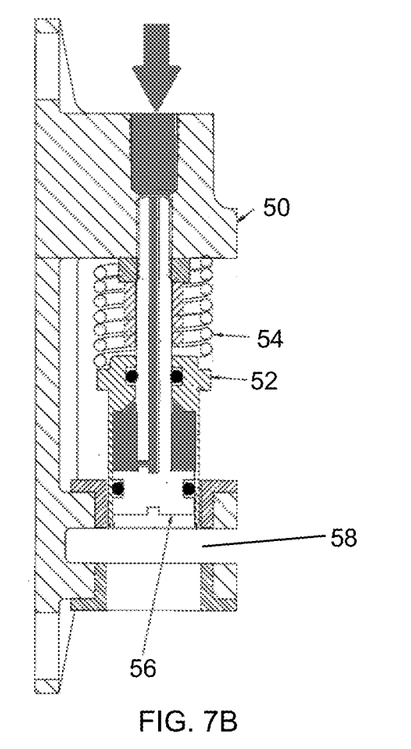
FIG. 7B shows a side cross-sectional view of an activation system in an open/cable released position.
Figure 8A:
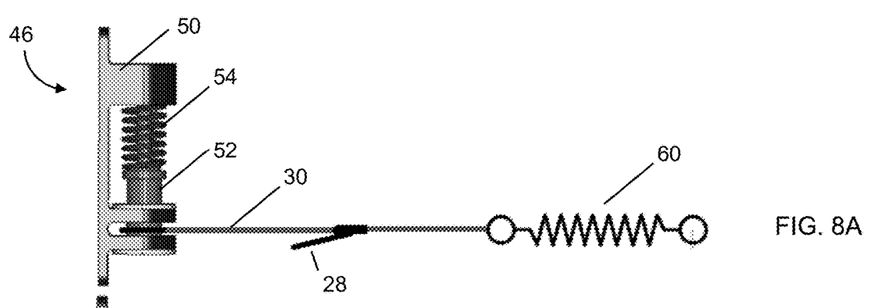
FIG. 8A shows a side plan view of an activation system securing a cable in a closed/cable secured position.
Figure 8B:
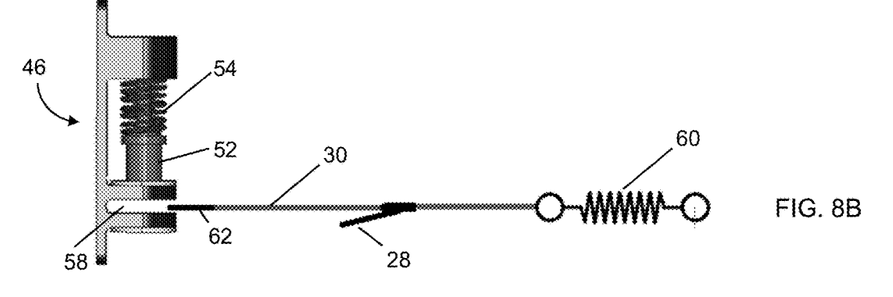
FIG. 8B shows a side plan view of an activation system securing a cable in an open/cable released position.

One example of an activation system 46 is illustrated by FIG. 6. The system provides a housing 50 that contains a movable sleeve 52. A spring 54 may also be attached to the sleeve 52 in order to help encourage upward and downward movement of the sleeve 52. In one example illustrated by FIG. 7, the sleeve 52 cooperates with respect to a piston 56. The housing 50 also features a cable securement area 58. As shown by FIGS. 8A and 8B, which show the pneumatic system housing 50 with the release cable 30, when the sleeve 52 is in the lowered position of FIG. 8A, the release cable 30 is secured in place. The release cable 30 may be pinned by the sleeve 52. The cable 30 may have a loop or ring 62 (shown in FIG. 2) that is received over the sleeve. Other cooperation options are also possible.

As also shown by FIG. 8, the release cable 30 is associated with an energy storing device 60. In the examples shown, the energy storing device 60 is provided as a spring. However, it should be understood that the energy storing device may be any of the above-described options. A first position of the release cable 30 has the energy storing device 60 in an "energy potential" position. This is illustrated by FIG. 8A. A second position of the release cable 30 has the energy storing device 60 in an "energy released" position. This is illustrated by FIG. 8B.

For example, when the release cable 30 is secured in the cable securement area 58 of the activation system 46, the energy storing device 60 holds stored energy. This is the "energy potential" position. In the example shown, the stored energy is in the form of an extended spring. When the cable 30 is secured as shown by FIG. 8A, a load is provided on the energy storing device 60. When the activation system 46 fires, it causes release of the sleeve 52. This is the "energy released" position. Release of the sleeve 52 in FIGS. 8A and 8B is illustrated as the sleeve being raised up and out of the cable securement area 58. This generally occurs via the activation system 46 according to known principles. Other options for release of the sleeve 52 are possible, as long as the sleeve movement allows release of the cable 30 from its secured position. In the examples shown, release of the sleeve 52 allows release of the release cable 30. The stored energy of the energy storing device 60 pulls the release cable 30 away from the cable securement area 58.

Movement of the release cable 30 causes consequent movement of the retaining devices 28 that are secured to the cable 30. This movement of the retaining devices 28 causes their disengagement from the apertures 26. Once the retaining devices 28 are disengaged from the apertures 26, the two panels 12, 14 are allowed to separate from one another due to pressure from the inflatable.

Figure 9:
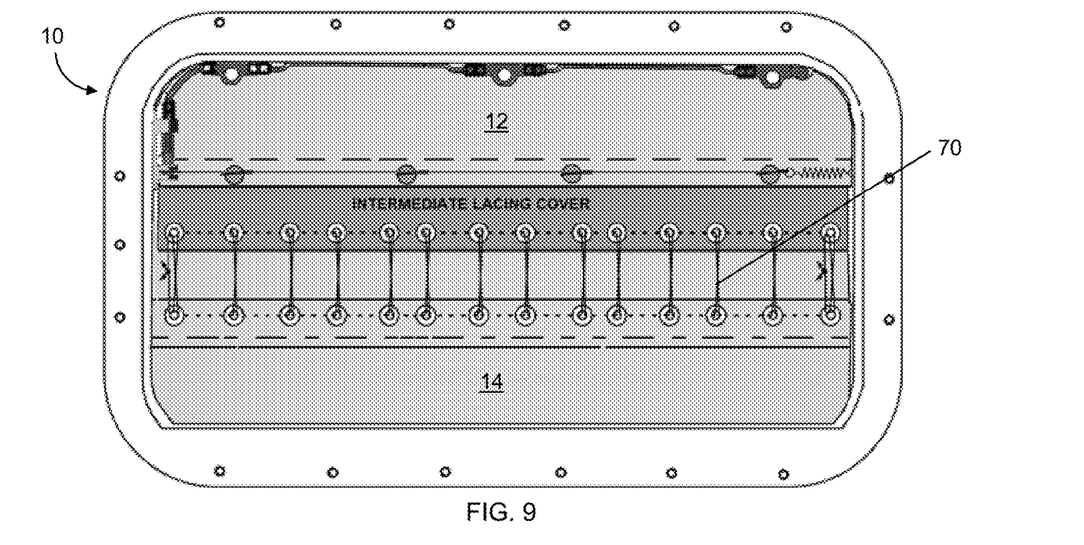
FIG. 9 shows one example of a release system incorporating optional laces.

Although not required, FIG. 9 illustrates that it is possible to provide optional laces 70 that also function to secure the panels to one another. This may serve a secondary securement function.

Changes and modifications, additions and deletions may be made to the structures and methods recited above and shown in the drawings without departing from the scope or spirit of the disclosure or the following claims.

What is claimed is:

1. A release system for inflatable life saving devices, comprising:
    a first panel comprising a plurality of protrusions;
    a second panel comprising a plurality of receiving openings, each receiving opening sized and configured for receiving a corresponding protrusion from the plurality of protrusions;
    a cable comprising (a) a plurality of retaining devices positioned along the cable and (b) an energy storing device;
    wherein each protrusion of the plurality of protrusions of the first panel comprises an aperture sized and configured for receiving one of the plurality of retaining devices,
    an activation system comprising a movable sleeve and a cable securement area, wherein one end of the cable is secured in place by the movable sleeve,
    wherein firing of the activation system releases the movable sleeve which releases the one end of the cable,
    wherein release of the one end of the cable causes activation of the energy storing device, which causes movement of the cable, which causes removal of the plurality of retaining devices from the plurality of protrusions.

2. The release system of claim 1, wherein the plurality of protrusions are shaped as parachute cones.

3. The release system of claim 1, wherein the plurality of receiving openings are reinforced by grommets.

4. The release system of claim 1, wherein the energy storing device comprises a spring.

5. The release system of claim 1, wherein the plurality of retaining devices comprise pins, rods, clips, fasteners, keys, or slide bolts.

6. The release system of claim 1, wherein the activation system maintains the cable in a secured position and releases the cable to a released position.

7. The release system of claim 1, wherein, in a stored position of the inflatable life-saving device, the plurality of retaining devices are received by the apertures of the protrusions, and the energy storing device is secured in an energy potential position.

8. The release system of claim 1, wherein, in a deployed position of the inflatable life-saving device, the plurality of retaining devices are removed from the protrusions due to release of the energy storing device, allowing separation of the first panel from the second panel.

9. A release system for inflatable life saving devices, comprising:
    first and second panels;
    an interlocking securement system comprising at least one first element on the first panel and at least one second element on the second panel, wherein engagement of the at least one first element with the at least one second element causes engagement of the first and second panels, a release cable comprising (a) at least one feature configured to engage with and release from one of the first or second elements and (b) an energy storing device;
    an activation system that maintains the release cable in a first position such that the at least one feature engages with one of the first or second elements, and that releases the release cable to a second position that releases the feature from one of the first or second elements,
    wherein the activation system comprises a movable sleeve and a cable securement area, wherein one end of the cable is secured in place by the movable sleeve, wherein firing of the activation system releases the movable sleeve which releases the one end of the cable, which causes activation of the energy storing device, which causes movement of the release cable, which causes removal of the at least one feature from one of the first or second elements.

10. The release system of claim 9, wherein the energy storing device comprises a spring.

11. The release system of claim 9, wherein the feature configured to engage and release the first and second element comprises a retaining device pin, and wherein one of the first or second elements comprises an aperture configured to receive the retaining device pin.

12. The release system of claim 9, wherein the first elements are protrusions and wherein the second elements are receiving openings.

13. The release system of claim 9, wherein the first position of the release cable comprises the energy storing device in an energy potential position and wherein the second position of the release cable comprises the energy storing device in an energy released position.

14. The release system of claim 9, wherein the at least one first element comprises a hinge protrusion and the at least one second element comprises a hinge receiving opening that engage with one another to secure the first and second panels to one another.

15. The release system of claim 9, comprising a plurality of first and second elements.

* * * * *